United States Patent [19]
Salter

[11] 3,928,967
[45] Dec. 30, 1975

[54] APPARATUS AND METHOD FOR EXTRACTING WAVE ENERGY

[76] Inventor: Stephen Hugh Salter, 143 E. Trinity Road, Edinburgh, EH53 PP, Scotland

[22] Filed: Nov. 6, 1974

[21] Appl. No.: 521,385

[30] Foreign Application Priority Data
Nov. 15, 1973   United Kingdom............... 53119/73
May 6, 1974   United Kingdom............... 19763/74

[52] U.S. Cl. .................. 60/398; 60/495; 415/7; 417/332
[51] Int. Cl.². F01D 25/00; F03G 7/00; F04B 35/00
[58] Field of Search .............................. 60/495–507, 60/398; 415/2, 7; 417/330–334, 337; 290/42, 43, 52, 53

[56] References Cited
UNITED STATES PATENTS
| | | | |
|---|---|---|---|
| 1,016,022 | 1/1912 | Lundquist............................... | 415/7 |
| 1,035,993 | 8/1912 | Moore ............................ | 417/334 X |
| 1,068,283 | 7/1913 | Starry............................. | 417/334 X |
| 1,074,292 | 9/1913 | Reynolds........................ | 417/334 X |
| 1,263,865 | 4/1918 | Dale.................................... | 415/7 X |

*Primary Examiner*—Allen M. Ostrager
*Attorney, Agent, or Firm*—Hill, Gross, Simpson, Van Santen, Steadman, Chiara & Simpson

[57] ABSTRACT

Apparatus and method for extracting the tremendous energy from a wave pattern as for example on the surface of a body of water which comprises a plurality of movable members so shaped that the surface of the member which engages the incoming wave causes the member to rotate about a substantially horizontal axis and remove energy from the wave and wherein the rear portion of the movable member is constructed so as to move with minimum energy transfer between the movable member and the fluid. The energy extracted by the movable member is converted into a hydraulic, electrical, mechanical, or chemical energy so as to allow the wave energy to be directly converted into useable form.

18 Claims, 6 Drawing Figures

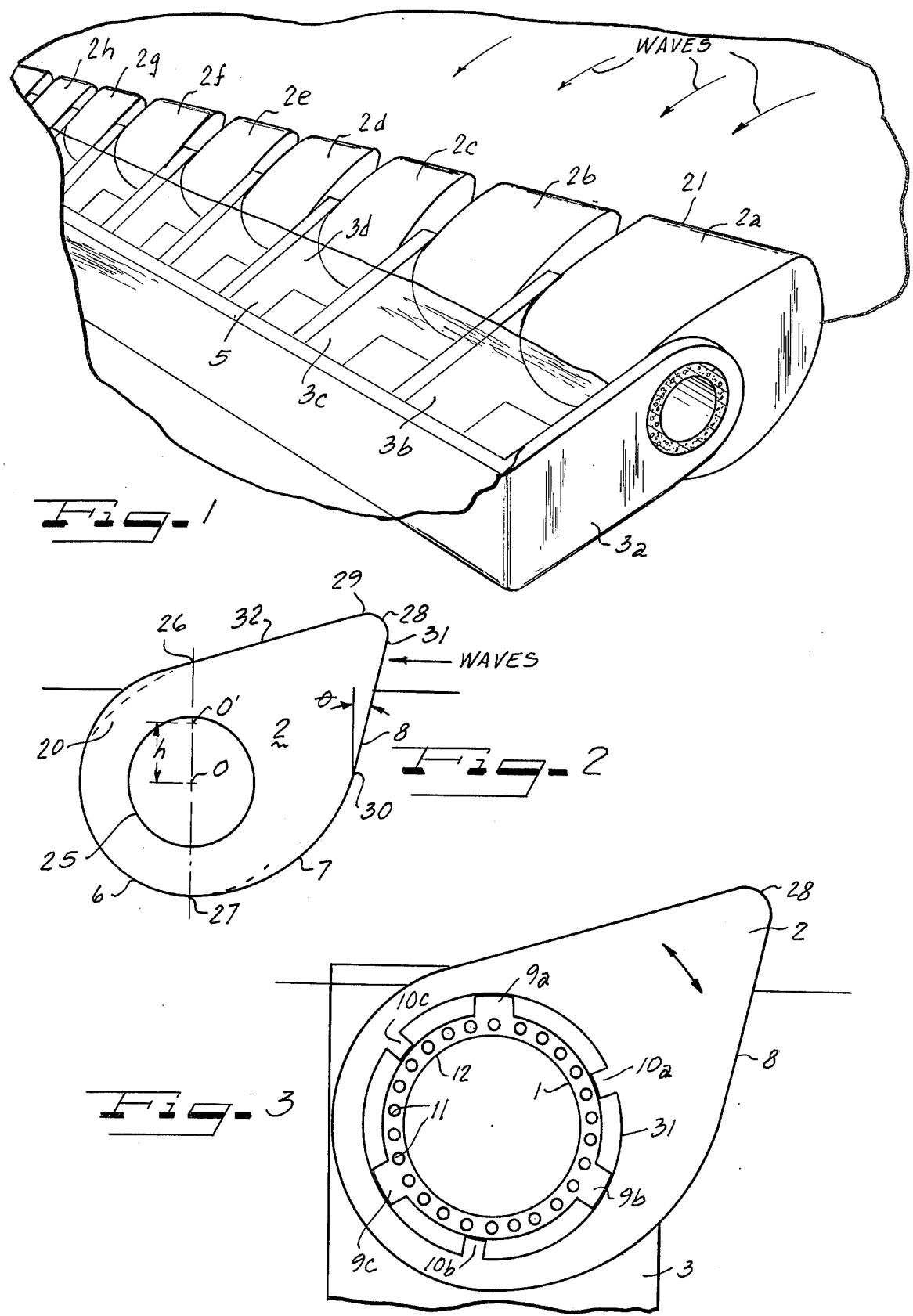

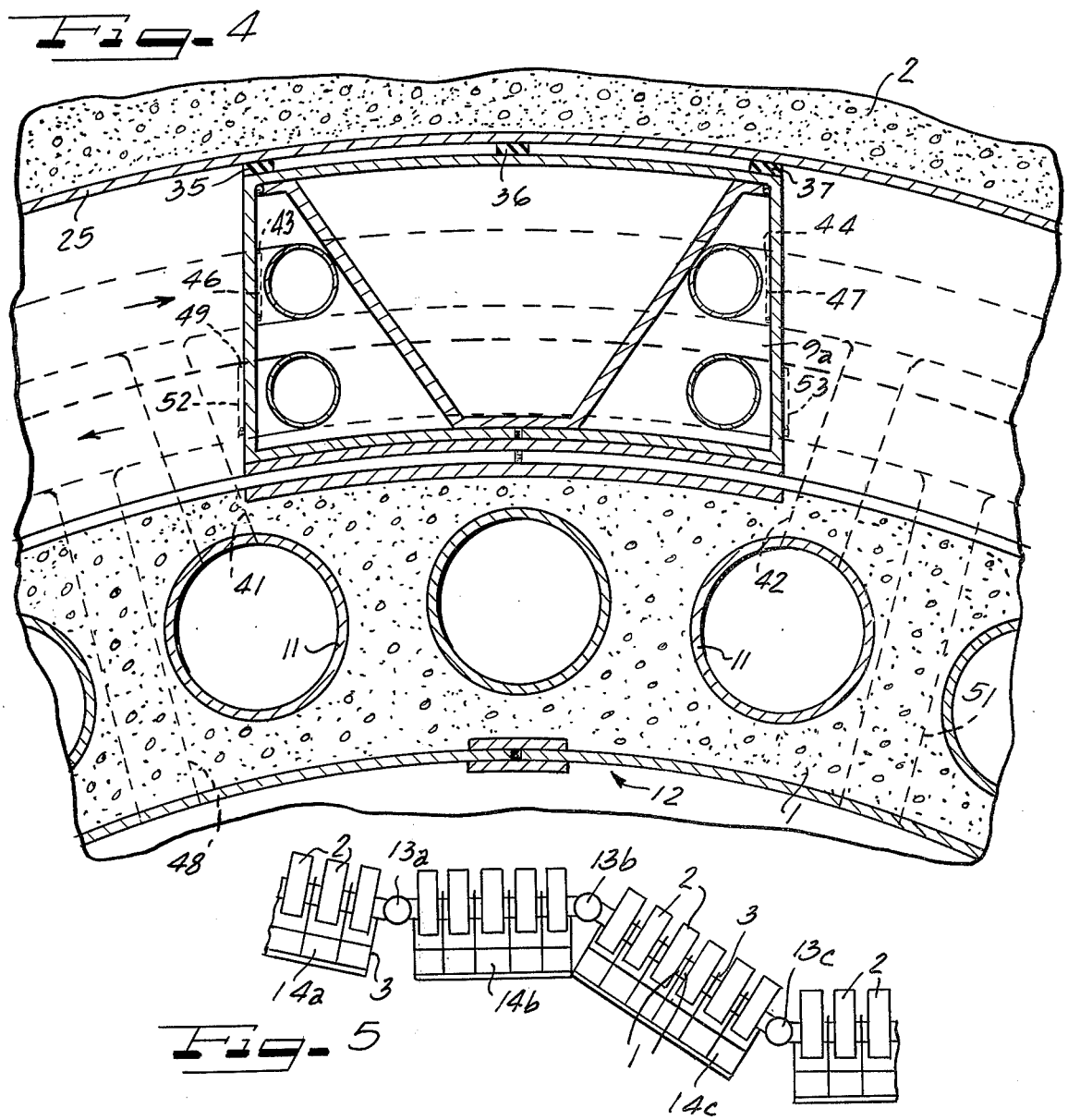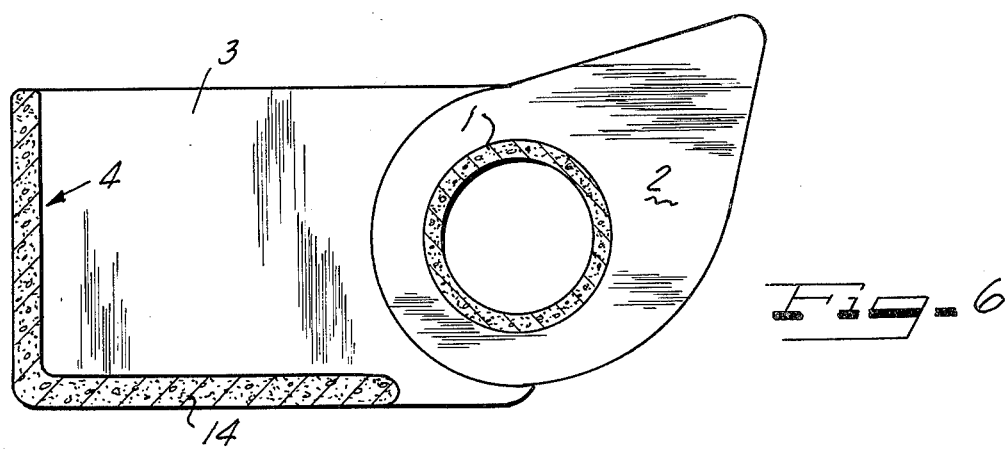

APPARATUS AND METHOD FOR EXTRACTING WAVE ENERGY

BACKGROUND OF THE INVENTION

1. Field of the Invention

This invention relates in general to means for extracting energy from the wave motion occurring on the surface of a body of water and particular to a novel method and apparatus for converting such energy into useable form.

2. Description of the Prior Art

It is well known that naturally occurring forces such as wind, the rotation of the earth can impart huge amounts of energy to large exposed masses of water of the earth which at least in part is converted into wave motion on the surface of the water. This tremendous amount of energy if utilized would provide an immense source of power, would conserve natural resources and reduce pollution and thus it would be very desirable to recover this energy which is substantially all wasted from the oceans and the inland seas.

Prior art proposals for utilizing the energy of the ocean waves to generate power have involved the use of flaps mounted to move on the water surface relative to a stationary member which is normally moored to a land mass. Such flaps have failed to extract more than a very small proportion of the available energy primarily because of the failure to appreciate the correct theory involved in the transfer of wave energy in water and due to this fact the moving parts of the apparatuses previously proposed have not been capable of efficiently coupling and transferring the energy in the water to the device where it is useable.

More recent developments have moved away from the flaps structure and have attempted to compress gas in the upper end of a vertical tube as the water level in the tube rises due to wave action. U.K. Specification No. 1014196 describes a device which works in this way. Small scale useful power applications from such systems have been utilized wherein compressed gas operates a gas turbine. This proposal however, has a very low efficiency primarily because it couples only the up and down movement of the water and also the extractive energy is in the form of large volumes of gas which has a relatively small pressure changes.

SUMMARY OF THE INVENTION

The present invention comprises apparatus and method of removing energy by providing a plurality of wave engaging members so shaped so as to efficiently remove energy from the wave and which pivot about a substantially stationary second portion of the device such that energy is removed from the wave as the first member pivots in either direction relative to the second part.

The energy removing pivoted member is shaped such that in cross-section it is generally circular in shape for about 180° and which has a wave engaging portion comprising the forward portion of the member which is constructed of tangents extending from the curved rear section and wherein the such tangents are joined by a forward nose portion. The device is pivoted near the center of the rear curved portion which results in little energy transfer between the rear portion of the member and the fluid after it is passed the member and wherein substantial portion of the incident wave energy is extracted from the wave by the forward portion of the member as the member is pivoted about its port.

The structure is such that the energy removing member displaces water on the incident wave side in phase of the turning movement of the member and does not displace substantially any water on the leeward side as the member pivots.

It is a novel feature of the present invention that the wave energy removing member of the present invention is not symmetrical about a vertical plane normal to the water passing through the pivot point of the energy removing member thus resulting in an isometrical member having substantially improved efficiency over prior art devices.

On June 21, 1974, Nature magazine, volume 249 number 5459 at pages 720 through 724 published an article entitled "Wave Power" of which I am the author and which discusses the wave height distribution in the North Atlantic as well as the distribution of annual power density. This publication is hereby incorporated by reference in this Specification.

In the present invention the design of the wave-engaging member results in maximum efficiency for the removal of energy from the wave and produces a machine and method which is much more efficient than devices of the prior art.

Although different cross-sectional shapes for the wave-engaging member are possible it has been discovered that it is desirable for the wave-engaging member to extend down from the free surface of the water to a depth of about 1/10 of the wave length of the waves to which it is to be coupled. In addition, the shape of the wave-engaging side of the wave-engaging member should be such that the displacement of water caused by such member at each depth at least approximately matches the diameters of the orbital movement of the waves at such depth. It is also desirable that the natural period of oscillation wave-engaging member about its support axis when the member is immersed in water to approximately match the wave period to which it is coupled.

Since in actual practice there is a spectrum of periods of waves and associated wave lengths which are to be encountered by the device, it is to be realized that the reference to period or wave length herein refers to a selected region of the spectrum at which peak coupling efficiency is desired.

Although it is possible to use a single member for removing energy from the wave pattern normally a plurality of such members mounted end to end will be desirable.

As a practical matter a plurality of wave-engaging members might be mounted in a row and pivoted about their rear portion. Such devices might be about 30 feet wide, about 45 feet in diameter adjacent their pivot point and might be about 60 feet long in the direction between their rear and forward edges. The plurality of these relatively large energy removing structures could be pivotly supported by a floating member or platform which allows the energy removing portions to be at least partially submerged such that the energy removing members rotate around the supporting member under influence of the wave action and the energy from the wave is converted into mechanical energy from the rotating relative motion between the energy removing member and the supporting member. For example, such motion could be utilized to operate a pump, an electrical generator or other device.

It has been desirable to construct the energy removing member such that it has a cross-sectional shape in planes normal to the free surface of the water and normal to the axis which supports it such that on the wave-engaging phase the water continues in its circular motion so as to cause a reaction on the energy removing member to rotate it upward and such that on the leeward phase of the energy removing member a shape is formed which is in the arc of a circle centered on the axis about which the member turns so as to provide minimum energy transfer between the rear portion of the member and the water.

The supporting member for the energy removing members should preferably be larger than several wave lengths so that forces due to waves having different phases will cancel. Each of the wave energy removing members should be as small relative to a wave so as to provide for efficient coupling to the wave pattern.

It is well known that the power contained in the wave pattern does not exist solely at the surface region of the mass of water but decays exponentially with increasing depth. About half of the power of the wave motion is in the water of levels above 0.07 lambda (where lambda is the wave length of the waves). At a depth of about 0.15 lambda the power is down to about ⅛ of that existing at the surface of the water. A preferred form of the energy removing member according to this invention extends downwardly to depths below 0.10 lambda and can thus by suitable design of its incident wave side extract energy from both the vertical and horizontal movements of the water in use of the wave pattern and can move substantially more than 50% of the available wave energy.

In order to convert the pivotal motion of the wave removing member into useable energy, a pump such as a variable stroke rotary pump having a stator fixed relative to the supporting member and having a rotor which turns with the energy removing member can be provided. In such pumps hydraulic bearings can be utilized.

The output from the pump may be directly used to generate electricity on the floating supporting structure as for example by feeding the output of the pump to a suitable turbine/generator. The turbine could be of the Pelton, Frencis or Kaplan types. Alternatively, instead of generating electricity on the floating structure, the output of the pump could be supplied through a suitable conduit to a remote location such as on shore wherein any conventional power generation system could be used to convert the pump output into power.

The structure of the invention can be freely floating and can be provided with position controlling motors so as to maintain the structure in a selected geographical position and so as to move the structure into the proper alignment as desired.

The structure may be associated with a floating processing plant where the energy is extracted from the wave pattern so that it can be effectively utilized.

Another feature of the invention is to provide a method of extracting energy from the wave pattern on the surface of a body of water comprising converting the wave energy into pressurized water in a pump which is driven by a movable member which extracts the energy from the wave and wherein the second portion of the pump is attached to a floating relatively immovable supporting member and wherein the top of the pump is used as a source of power.

It has been discovered that the transmission of energy by wave motion is very efficient in deep water. In deep water, for example, a wave loses 30% of its height only when it has traveled a number of miles which are equivalent to its wave length in feet. However, as the water depth becomes less than ⅓ the wave length and the energy is rapidly dissipated and for this reason the method and apparatus of the invention is preferably utilized under floating structures operating in deep water.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 illustrates the invention.

FIG. 2 is a side elevational view of one of the energy removing members of the invention.

FIG. 3 is a sectional view.

FIG. 4 is an enlarged sectional view of a portion of FIG. 3.

FIG. 5 illustrates a plurality of units connected together, and

FIG. 6 is a sectional through one of the elements in FIG. 5.

DESCRIPTION OF THE PREFERRED EMBODIMENTS

FIG. 1 illustrates the invention mounted in the sea so as to intercept and convert wave energy into useable form. A platform structure 4 which may be partially submerged and has an upper portion is formed with a plurality of fins or ribs 3 designated generally as 3a, 3b, 3c . . . . The plurality of cylindrical stator members 1 extend between the fins 3 and support for pivotal motion relative thereto energy removing members 2 which are designated in FIG. 2 as 2a through 2h. The energy removing members 2 are supported at their rear edge relative to the oncoming wave so that their free ends 21 may engage and oscillate with the waves. It is this energy in the waves which is converted by the machine of this invention into useable energy.

Energy converting and utilizing equipment is designated as 5 and may be built into the device.

The platform 4 and its supporting structure may be a half kilometer or so in length and a number of energy removing members 2 may be supported on a single unit.

FIG. 2 is a side sectional view of an energy removing member 2. The stator supporting member 1 passes through the opening 25 which is centered at point 0 and the leeward side 6 of the energy removing member 2 is formed of a curved section extending from point 26 to point 27 having a radius from point 0 to points 26 and 27 such that the rear or leeward side 6 of the member will be round and will not displace water to the rear of the device as the member 2 oscillates. A tangent portion 32 extends from point 26 to point 29. A section 7 extends from point 27 adjacent the end of portion 6 to a point 30. The curvature of the segment 27 to 30 is centered about a point 0 prime which is spaced a distance h above the centered point 0. The dimension h is about ½ the radius between point 0 and surface 6. From point 30a straight section 8 extends to point 31 where it is joined with point 29 by a curved section 28 to form frontal portion of the member 2. The angle theta between a vertical to point 30 and the wall of portion 8 of the member 2 can be about 15° with a member 2 oriented generally as shown in FIG. 2 at rest in calm water.

It has been discovered that an energy removing member having a profile according to FIG. 2 will be capable of extracting more than 90% of the wave energy impinging upon it under the best conditions.

When the machine of FIG. 1 is immersed in the water and when a wave from the right relative to FIG. 2 impinges upon the forward portion 8 the member 2 will pivot or oscillate about the center O. It is to be particularly noted that the leeward side 6 does not displace any water as the member 2 oscillates whereas on the other hand the portions 7 and 8 displace water in phase with the turning movement of the member 2. It is to be particularly noted that the magnitude the displacement of the water by the portions 7 and 8 will be greatest at the surface and will decrease with increasing depth.

It is to be realized, of course, that as incoming waves impinge upon the surface 8 the wave motion will cause the member to oscillate around the supporting member 1 and the present invention converts such motion into useful energy.

FIG. 3 is a sectional view through one of the energy removing members 2 and the cylindrical supporting member 1 and wherein a rotary water pump of the spline type is formed between the supporting member 1 and the internal structure of the member 2. The supporting member 1 is formed with a plurality of generally horizontal ridges 9a, 9b and 9c which are spaced equal distance about the member 1 and which extend outwardly toward the inner opening 31 of the energy removing members 2. The plurality of inwardly extending ribs 10a, 10b and 10c are attached to the energy removing member 2 and extend toward the periphery of the member 1. The outer faces of the ribs or ridges 9 may be provided with openings through which high pressure water is supplied through a restriction by an auxiliary pump not shown to provide hydrostatic bearing between the member 1 and 2.

Pumping occurs as the energy removing member 2 oscillates clockwise and counter-clockwise. For example, relative to FIG. 3 as the member 2 moves counter-clockwise relative to the Figure the rib 10a will exert pressure on the water in the chamber between rib 10a and rib 9a which will force such water through a one-way valve in rib 9a into the high pressure output conduit of the system. Simultaneously, of course, the rib 10b will force water into a one-way valve in the stator rib 9b where it then will be supplied to the high pressure output conduits. Also, rib 10c will force water through a one-way valve in rib 9c. Simultaneously as the member 2 rotates counter-clockwise low pressure water will be supplied into the chamber between rib 9a and rib 10c as well as between rib 9c and rib 10b and rib 9b and rib 10a. One-way valves are provided in the ribs 9a, 9b, 9c so as to provide fluid at low pressure into these chambers as the member 2a moves counter-clockwise relative to FIG. 3. Subsequently, the member 2 will rotate clockwise relative to FIG. 3 and during rotation in this direction the rib 10a will exert pressure on the fluid between it and rib 9b and will force water under pressure through a one-way valve in rib 9b into the high pressure system. Likewise, the ribs 10b and 10c respectively, will exert pressure on the water between rib 10b and rib 9c and rib 10c and rib 9a. Simultaneously, water will be drawn into the chamber between rib 9a and rib 10a through a one-way valve from rib 9a which supplies low pressure water into such space. Likewise, low pressure water will be drawn into the space between 9b and 10b and space between ribs 9c and 10c.

FIG. 4 is an enlarged sectional view of the structure illustrated in FIG. 3. It is to be noted that seals 35, 36 and 37 are provided between the rib 9a and the internal surface 25 of the energy removing member 2. A plurality of high pressure manifolds 11 are formed in the member 1 and are connected by a plurality conduits such as 41 and 42 to a plurality of openings 43 and 44 respectively, which open into cavities between ribs 10b and 19c respectively. A plurality of valves 46 and 47 are mounted in conduits 41 and 42 adjacent openings 43 and 44 as shown.

Conduit 48 extends from the central low pressure manifold 12 and has a plurality of openings 49 into the cavity between rib 9a and rib 10c. A plurality of conduits 51 extends from the low pressure manifold 12 to the cavity between rib 9a and rib 10a. One-way valves 52 and 53 are mounted in conduits 48 and 51, respectively.

The high pressure manifolds 41 and 42 might be about 1 meter in diameter and operate under pressure in the order 400 psi. Internal low pressure manifold 12 returns water from the power apparatus as for example from the turbines or alternatively may be directly connected to supply sea water at low pressure to the pumps.

The fins 3 contain trim tanks, pressure smoothing accumulators and necessary conduits for connecting the high pressure manifolds 11 with a power generating apparatus 5. It is to be realized, of course, that suitable coupling as for example, by upsetting the ends of the pipe and suitable connections are made through the fins 3 to the power generating equipment 5 in conventional manner.

As shown in FIG. 6, the bottom of the fins 3 are weighted with a mass of concrete 14 so as to maintain the center of gravity of the entire structure below the metacenter.

As the transverse length of the devices increases the structure samples a wider range of wave phases and becomes steadier and steadier. The worst conceivable bending moments increase with the square of the length so that in adverse weather conditions they can become dangerous. FIG. 5 illustrates one solution to this problem where adjacent sections 14a, b and c are joined by pivotal joints 13a, 13b, 13c. The joints 13a through 13c can be locked and unlocked as desired to compensate for different weather conditions.

In the structure illustrated in FIG. 1, the supporting frame 4 and the members 1 are shown as straight sections between adjacent members 2. However, it is to be realized that a small directional change in the axis of the members 1 could be made between each of the members 2 so as to provide an arcuate shape to increase stability of the device in unidirectional seas. The unused space in the platform 4 including space between the inner and outer tubes may be filled with a mixture of lightweight concrete glass fiber and resin if desired.

FIG. 6 is a cross-sectional view through a modified structure in which the fin 3 extends to leeward of the energy converting members 2 and the leeward extremities of the fins 3 are connected together by L-shaped strengthening sections 14. The strengthening sections 14 can house steel tubes for the hydraulics of the structure and be so positioned to locate the center of gravity of the entire structure in the optimum position.

Although the pump illustrated in FIGS. 3 and 4 is a spline pump, it is to be realized of course that it is not necessary that such a pump be employed and pumps of any type can be utilized. For example, a multiple single-acting piston and cylindrical pumps disposed with their axes parallel the axis of the member 1 and which are mounted so as to be actuated by annular cam surfaces formed on or attached to the confronting ends of the adjacent energy converting member can be used. With this arrangement as the energy converting members 2 oscillate the single-acting pumps will be operated by the relative movement of the annular cam surfaces so as to generate high pressure water.

It is also possible to directly convert the movement of the energy removing members 2 into electrical power as for example by mounting permanent magnets around the cylindrical aperture 25 of the members 2 which generate electrical power in stator coils wound about the member 1.

Each elementary particle of water in a wave moves in a circular path. At the surface of the water, the radius of this circle is equal to the amplitude of the wave, but the magnitude of this radius decreases with depth as $e^{-2\pi d/\lambda}$ where $d$ is the depth. Although the shape of member 2 shown in FIG. 2 is satisfactory, improved designs can be obtained by modifying the waveward portion of the member 2 so that for any unit angle of rotation in the clockwise direction the volume of water displaced at each height decreases exponentially or more nearly so than that obtainable using the shape of member 2 in FIG. 2. This allows more efficient coupling of the member to the wave pattern down to the full depth of insertion of the member 2.

Although it is important not to have any substantial in-phase displacement of water on the leeward side of the member 2 it is possible to improve performance at longer wavelengths by deliberately displacing water to leeward of the member 2 in antiphase with the movements of the member 2. This can be achieved, for example by curving in the upper rear surface of the member 2 as shown in dotted line at 20 in FIG. 2.

It is theoretically predicted that efficiencies approaching one hundred per cent are obtainable with a member 2 of the kind specified.

Although I have found by experimentation using working models that the complex curve of member 2 defined herein is very efficient (over 90% efficient), it is to be realized that other complex curves can be utilized to practice my invention in that the key inventive concept is to an energy converting member wherein the rear portion does not generate a new wave and the front portion allows the water to move as nearly as possible in its original orbit.

The center of gravity of member 2 will be selected so that the orientation of FIG. 2 exists in still water.

It is to be realized that under extreme weater conditions the entire machine can continue to operate at reduced power if it is submerged. This of course can be accomplished by changing the ballast.

It is seen that this invention provides an improved apparatus and method for removing energy from a wave pattern on the surface of a body of water or other fluid and although it has been described with respect to preferred embodiments, it is not to be so limited as changes and modifications may be made which are within the full intended scope as defined by the appended claims.

I claim as my invention:

1. Apparatus for extracting energy from a wave pattern on the surface of a body of water comprising, a first body, a horizontal shaft supported by said first body, a second member pivotally supported on said horizontal shaft and having a vertical cross-sectional contour of asymmetrical shape with a rear circular portion having a radius centered at the center of said horizontal shaft and a forward generally pointed portion extending from said rear circular portion and means for generating power from relative motion of said body and said second member.

2. Apparatus according to claim 1 including an upper portion of said forward portion extending straight and tangentially from said rear portion, a lower portion of said forward portion extending straight and tangentially from said rear portion and a curved front point joining said upper and lower portions.

3. Apparatus according to claim 1 wherein said forward portion has an upper portion which extends tangentially and straight from said rear portion, a first lower portion of said forward portion formed on a curve centered above the center of said horizontal shaft by a distance one half the radius of said rear circular portion and tangentially joining said rear circular portion, a second lower portion of said forward portion extending straight and tangentially from said first lower portion, and a curved front point portion joining said upper portion and said second lower portion.

4. Apparatus according to claim 2 comprising a plurality of second members similarly shaped pivotally supported on said horizontal shaft and with their forward portions extending in the same general direction.

5. Apparatus according to claim 3 comprising a plurality of second members similarly shaped pivotally supported on said horizontal shaft and with their forward portions extending in the same general direction.

6. Apparatus according to claim 1 wherein said power generating means comprises a water pump.

7. Apparatus for extracting energy from a wave pattern on the surface of a body of water comprising, a first body, a horizontal shaft supported by said first body, an energy removing member pivotally supported on said shaft and having a center of gravity and in calm water said energy removing member having a vertical cross-sectional contour in a plane normal to said shaft which comprises, a rear semi-circular portion having a radius centered at the center of said shaft and extending from a vertical plane extending along the center line of said shaft, a forward portion comprising a first upper straight portion which extends upwardly from the upper end of said rear semi-circular portion, a lower curved portion joining the lower end of said rear semi-circular portion and has a radius equal to the distance from a point above the center of the shaft a distance of one half the radius of said rear semi-circular portion to said lower end of said rear semi-circular portion, said lower curved portion extending upwardly to a point where a tangent to the curve makes an angle between 10 to 20 degrees with the vertical, a second lower straight portion extending from the upper end of said lower curved portion generally along said tangent, and a curved front point joining the forward ends of said first and second straight portions, said second member having a width sufficient to intercept waves, and means for generating power connected to said first body and said energy removing member to generate power upon relative motion between said body and said member.

8. Apparatus according to claim 7 wherein said tangent makes an angle of about 15 degrees with the vertical.

9. Apparatus for extracting energy according to claim 7 comprising a plurality of similar energy removing members mounted for pivotal movement on said shaft and said power generating means coupled to said plurality of energy removing members.

10. Apparatus according to claim 7 wherein said first body and said energy removing body float in said body of water.

11. Apparatus according to claim 9 wherein the combined width of said plurality of energy removing members is several wave lengths long.

12. Apparatus according to claim 9 wherein said power generating means comprise pumps having stators mounted on said horizontal shaft and rotors mounted on said energy removing members.

13. Apparatus according to claim 12 wherein said pumps are rib pumps.

14. Apparatus according to claim 7 wherein said rear semi-circular portion has a top portion which is contoured somewhat below the radius of the remaining portions of said rear portion so as to displace water in anti-phase to water which may have passed below.

15. A method of extracting energy from a wave pattern on the surface of a body of water comprises transferring the energy of the water in a layer of the body adjacent to the surface to an energy removing member supported in the water for turning movements about an axis parallel to the surface and normal to the direction of propagation of the wave, the surfaces of said energy removing member facing towards and away from the wave being shaped so that when said member oscillates in the water about its turning axis, the side towards which the waves are moving extracts energy from the water, while the opposite side does not displace substantially any water as it rotates and so does not transmit onwards to the water any substantial amount of the said extracted energy.

16. The method as claimed in claim 15, in which the energy removing member contacts a body of water which extends down from the water surface about one tenth of a wavelength in depth.

17. The method of claim 15 wherein the energy removed is in the form of pressurized fluid.

18. The method of claim 17 wherein the pressurized fluid is used to power a turbine generator.

* * * * *